United States Patent [19]
Boulton et al.

[11] Patent Number: 4,823,061
[45] Date of Patent: Apr. 18, 1989

[54] STONE EXPANSION CONTROL FOR A HONING MACHINE

[75] Inventors: Michael A. Boulton, Cheltenham; Joseph I. Roberts; Hamid R. Bassirat, both of Macclesfield, all of England

[73] Assignee: Delapena Honing Equipment Limited, Gloucestershire, England

[21] Appl. No.: 91,574
[22] PCT Filed: Dec. 16, 1986
[86] PCT No.: PCT/GB86/00766
§ 371 Date: Jul. 30, 1987
§ 102(e) Date: Jul. 30, 1987
[87] PCT Pub. No.: WO87/03711
PCT Pub. Date: Jun. 18, 1987

[30] Foreign Application Priority Data
Dec. 16, 1985 [GB] United Kingdom ................. 8530921
Jun. 30, 1986 [GB] United Kingdom ................. 8615915

[51] Int. Cl.⁴ ............................................. G05B 19/29
[52] U.S. Cl. ................................... 318/603; 51/34 C; 51/165.93
[58] Field of Search ............ 318/603; 51/34 C, 165.93

[56] References Cited
U.S. PATENT DOCUMENTS 3,126,672  3/1964  Calvert et al. ..................... 51/34 C
3,404,490 10/1968  Estabrook ......................... 51/165.93
4,455,789  6/1984  Gehring ............................. 51/34 J
4,679,357  7/1987  Richter et al. .................... 51/281 P Primary Examiner—Bernard Roskoski
Assistant Examiner—Saul M. Bergmann
Attorney, Agent, or Firm—Wenderoth, Lind & Ponack

[57] ABSTRACT

A honing machine has a stone expansion system in which the honing stones are expanded radially via wedges by radial movement generated by a d.c. wedge motor. The motor (13) is driven by a constant-current amplifier (50) which provides a driving current according to a required stone pressure (a). This determines the torque of the motor during honing. A speed input (g) sets a required approach speed and from this is derived a control signal which controls an on/off controller (55). This causes the output current of the constant-current amplifier to be choppped, therby controlling speed as the stones approach the wall of the bore while allowing control of torque during honing.

12 Claims, 6 Drawing Sheets

STONE EXPANSION CONTROL FOR A HONING MACHINE

The invention relates to stone expansion control for a honing machine. Honing machines are used for fine-finishing cylindrical bores in work-pieces such as automobile cylinder blocks and hydraulic and pneumatic components of all kinds.

In general, a honing machine has a rotatable spindle which carries at its end abrasive stones mounted in carriers which may be expanded radially. In a honing operation the spindle enters the bore in the work-piece and is rotated as the work-piece and spindle are reciprocated with respect to each other. Radial pressure is applied to urge the stones against the wall of the bore.

When the stones are introduced into the bore they must be in a radially retracted position. The stones are then expanded radially at an approach rate to approach the wall of the bore. Honing commences and as the stones remove material from the work-piece they are fed radially outwardly at a honing feed rate until the required bore size has been reached, whereupon the stones are retracted, ready for the next work-piece.

It is desirable to control accurately the stone pressure during honing and also the approach and feed rates. Hitherto, stone expansion drive means have included hydraulic motors or pistons. Examples of such arrangements are described in British patent specification No: 2111876 and European patent specification No: 0063983. Such systems are not satisfactory for high precision control because in practice there are variations in the properties of the drive system and particularly the thermal properties of the hydraulic fluid which seriously affect positional accuracy. These problems are exacerbated by the requirement to supply hydraulic fluid through a rapidly rotating gland.

For the above reasons, electric motor drive for the stone expansion system is better. Such a system is described in U.S. Pat. No. 4,528,776. Here a d.c. motor is controlled in speed by a control input. With such an arrangement, however, the operator has no control over the torque of the motor except to set a cut-out level. It is desirable for the operator to be able to control both the torque (and thus the stone pressure) and the speed. The present invention provides an improved stone expansion system.

According to one aspect of the invention there is provided a stone expansion system for a honing machine which has honing stones mounted to expand radially with respect to a spindle of the machine; a stone expansion drive motor and a stone expansion drive linkage coupling the motor to the stones, the motor being a d.c. electric motor, the stone expansion system being characterised in that there is provided a constant-current amplifier connected to drive the motor; a torque control system whereby the operator can set a torque command input to determine the amplitude of the current from the constant-current amplifier; and a speed control system whereby the operator can set at least one speed command input to determine the speed of the motor, the arrangement being such that the speed control system is effective to ensure control of speed as the stones approach the wall of the bore and that the torque control system is effective to control stone pressure during honing.

There are two ways of controlling a d.c. motor: by controlling the driving voltage or by controlling the driving current. If the driving voltage is controlled then motor speed and current will vary with load and the motor torque will vary to meet the load demanded. The torque delivered will therefore not be controlled. In a stone expansion system the stone pressure will therefore not be controllable by the operator.

If, on the other hand, the driving current is controlled, as by, for example, control of a constant-current amplifier connected to drive the motor, then torque will be controlled but motor speed will not. In a stone expansion system it is particularly important to control the expansion speed as the stones approach the wall of the bore being honed. If the stones are moving too rapidly radially when they meet the wall of the bore the inertial energy of the stones, carriers and drive system will result in a large impact shock as the stones come to a halt, with consequent damage. While a constant torque system is very desirable to control the pressure of the stones during honing, it would normally give rise to uncontrollably high speeds when the motor encountered no resistance during approach to the wall of the bore. The present invention provides a solution to this problem.

It is envisaged that the speed control system may comprise a voltage controller effective during the stone approach phase, and that control may be switched to the constant-current amplifier torque control system for the honing phase. However, in a preferred arrangement the speed control system is effected by modifying the constant-current amplifier control system. In this way joint speed and torque control may be exercised by the output from the constant-current amplifier, being predominantly speed-responsive during the approach phase and predominantly torque-responsive during the honing phase. Thus, preferably the speed control system comprises an on/off chopping controller responsive to the speed command input and effective to cause the output current from the constant-current amplifier to be modulated in an on/off manner to control the speed of the motor.

Preferably the speed control system is a feed-back system, there being a speed detector coupled to the motor which gives an output in accordance with the motor speed, and a comparator arrangement for comaring the output of the speed detector with the speed command input to give a speed error signal, the on/off chopping controller being responsive to the speed error signal.

Preferably the speed control system accepts a first speed command input representative of required stone approach speed and a second speed command input representative of required honing feed speed and means are provided for detecting when the stones come into contact with the wall of the bore being honed and for automatically changing the input control speed of the speed control system from the approach command input speed to the honing feed command input speed when the stones meet the wall of the bore.

A digital encoder may be coupled to the motor for providing an output pulse for each increment of motor movement. The pulses are counted to give a positional output and the pulse rate is measured to give a speed output. The "stones in contact" signal is generated when the pulse count does not change or does not change appreciably in a given time.

Over-ride means may be provided for over-riding the torque command input to increase incrementally the amplitude of the current from the constant-current amplifier if the motor speed does not meet the speed command input.

The on/off chopping controller may be a variable square-wave generator in which the mark/space ratio is adjusted in accordance with the speed command input. A particularly convenient form of on/off controller is one which is responsive to switch the drive current to the motor on when the motor speed falls below a lower limit and to switch the current off when the motor speed rises above an upper limit, thereby generating a square wave current which controls the motor speed, the upper and lower limits being derived from the speed command input setting.

A practically convenient way of implementing the control function described above is to use a microprocessor control system, there being an input console which accepts digital command inputs from the operator and a clock-controlled sampling system which samples the position of the stones repetitively from a digital encoder, the torque control system and the speed control system being implemented by respective microprocessor program routines deriving data inputs from the input console and the sampling system.

It is convenient for the operator to specify a required stone pressure for the honing phase. Generally, the stone expansion system will include a wedge arrangement whereby axial movement with respect to the spindle axis caused by the d.c. motor is converted to radial stone movement. Thus, stone pressure and movement is related to motor torque and movement by the tangent of the wedge angle. Since the wedge angle for particular operations may be changed, it is preferable to provide that the torque command input and, where appropriate, the maximum torque command input, are derived by conversion means, there being provided an operator input means which allows the operator to specify a stone pressure command input and, where appropriate, a maximum stone pressure command input and another operator input means which allows the operator to specify the wedge angle, the torque command signals being derived in the conversion means by a calculation taking account of the stone pressure command and wedge angle specified. In practice it is convenient also to convert the demanded approach and honing feed speed signals having regard to the wedge angle in the same way.

Another requirement for accurate honing is precise position control of the wedges. Normally, the drive system for the wedges is complicated mechanically because of the requirement to rotate the spindle. The spindle projects rearwardly from a bearing block and is driven by a pulley. The wedge strips are accessible at the end of the spindle beyond the pulley. Therefore, a mount for the wedge control mechanism must extend past the pulley to the bearing block. This mechanical complication leads to inaccuracy in wedge position control. Another aspect of the invention seeks to provide an improvement.

According to another aspect of the invention there is provided a honing machine comprising a spindle; an expandable honing stone carrier arrangement at the end of the spindle; a stroke motor for reciprocating the spindle relative to a work-piece; and a wedge control system for expanding the stroke carrier arrangement by axial movement of wedges having extension strips which pass along the hollow spindle; there being provided a drive motor for rotating the spindle reciprocates with the spindle and comprises a stator/rotor assembly, the rotor having a hollow core which carries the hollow spindle, the stator being mounted in a housing assembly, the wedge extension strips passing through the core of the rotor and the wedge control system being fixed directly to the stator housing assembly. With this arrangement a drive pulley for the spindle is not necessary and direct mounting of the wedge control system improves wedge control accuracy.

The invention will further be described with reference to the accompanying drawings, of which:

Figure 1:
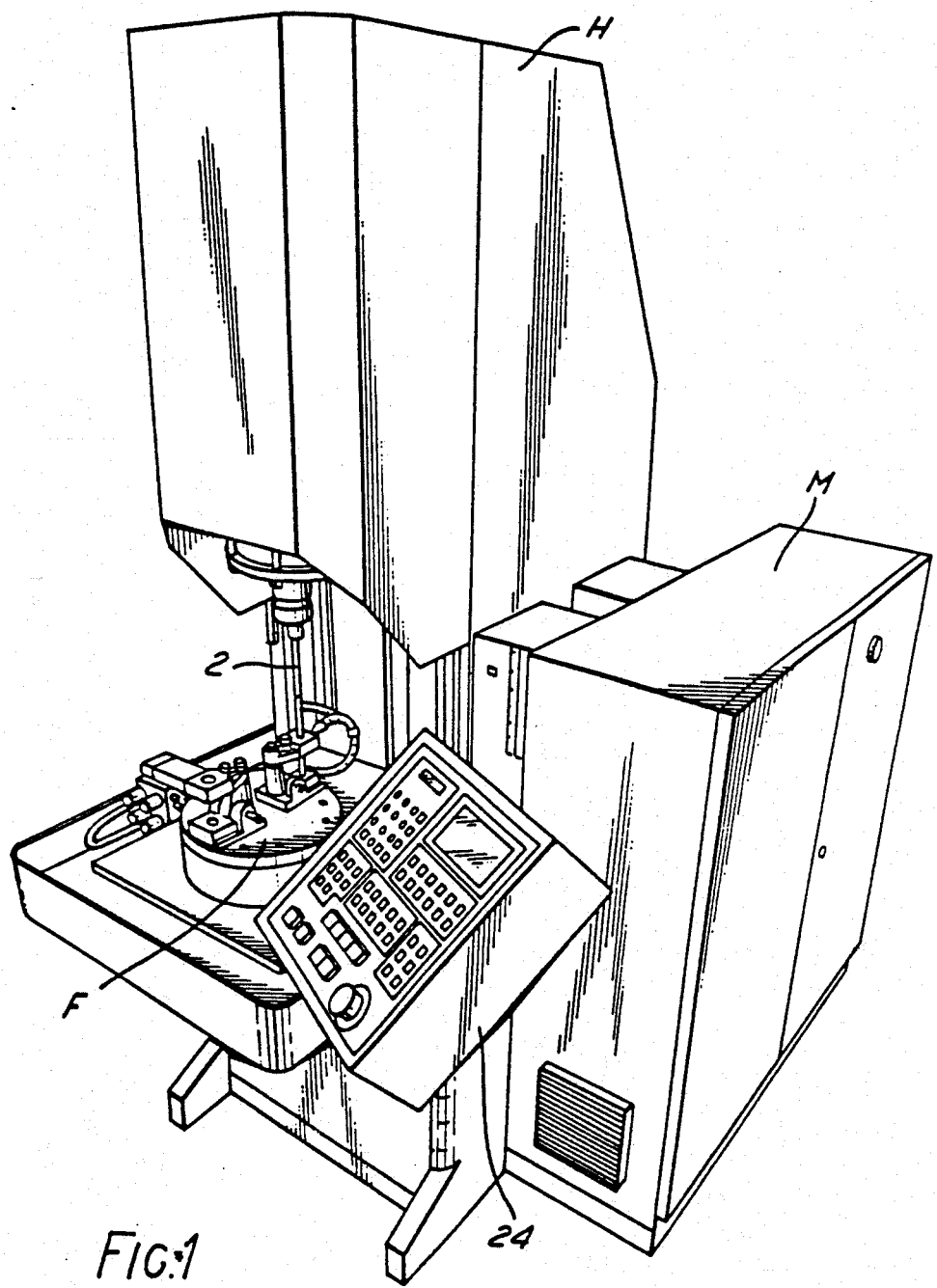
FIG. 1 is a perspective view of a honing machine which embodies the invention.

Referring to FIG. 1 there is shown a honing machine for honing a work-piece mounted on a table fixture F. A honing spindle 2 carries honing stones at its end which engage the wall of the bore in the work-piece to effect honing. The spindle is rotated by a spindle motor (not shown in FIG. 1) which is mounted on a carriage which reciprocates vertically on runners under control of a stroke motor mounted in housing H. Control of the machine is effected by a micro-processor housed in a housing M. A console 24 allows an operator to set various parameters for controlling the machine.

Figure 2:
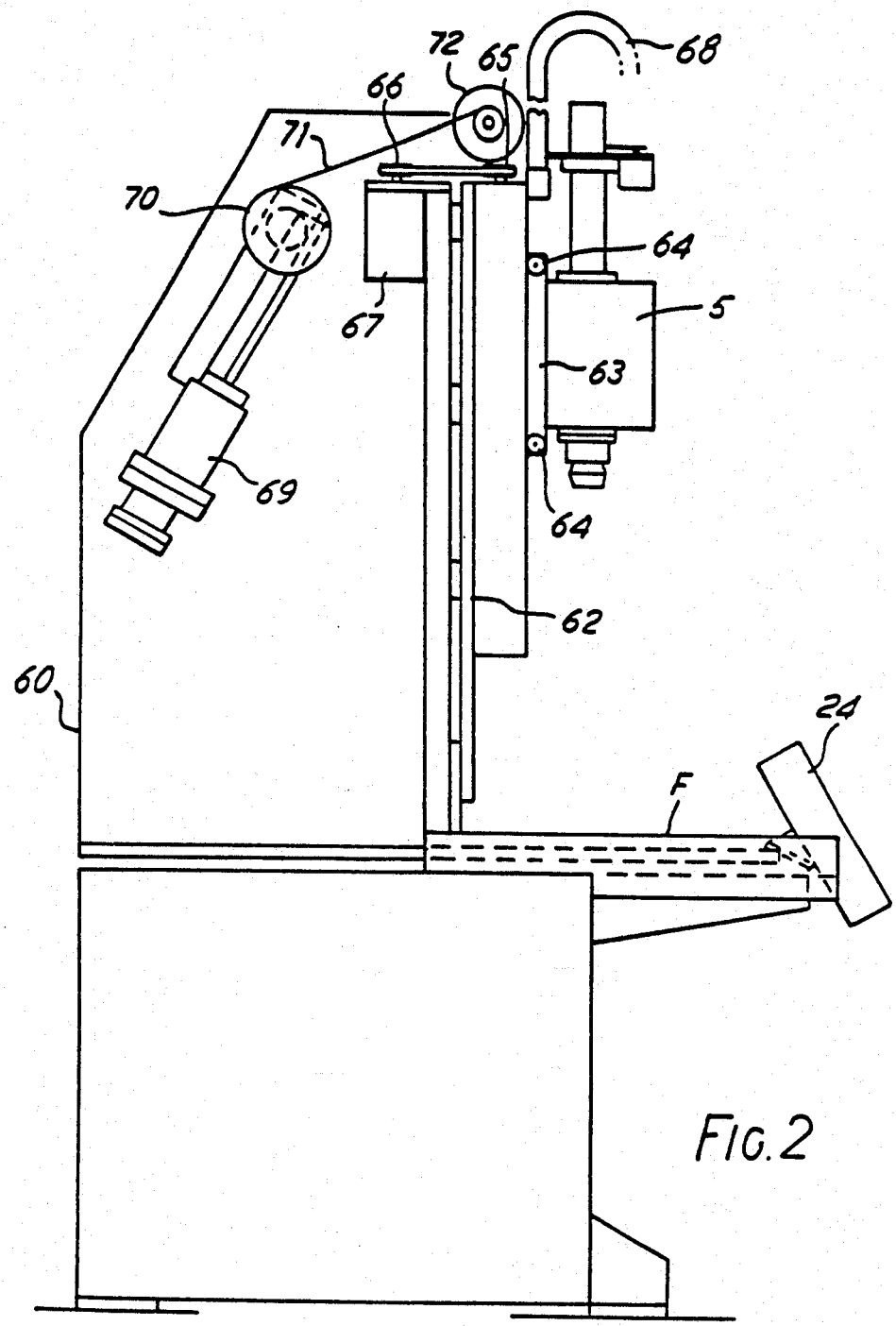
FIG. 2 is a side elevation of the machine of FIG. 1.

FIG. 2 shows the structure of the machine in more detail. The machine has a frame 60 which supports the table fixture F where work-pieces are clamped. The frame provides vertical runners 62 on which is guided a carriage 63 which has rollers 64. Linear bearings may alternatively be used. A lead-screw is mounted vertically and has a drive pulley 65 at its upper end. Pulley 65 is coupled by a toothed belt 61 to a pulley 66 on a motor 67. The spindle motor is shown at 5 mounted on the carriage and power is conveyed to it by a flexible cable 68.

A counter-balance arrangement comprises a hydraulic cylinder 69 having a piston which is coupled to the carriage by a chain and pulley arrangement 70, 71, 72. Pressure in the cylinder is controlled to provide a force which precisely counterbalances the weight of the carriage and spindle motor. This arrangement has less inertia than a counter-weight would have.

Figure 3:
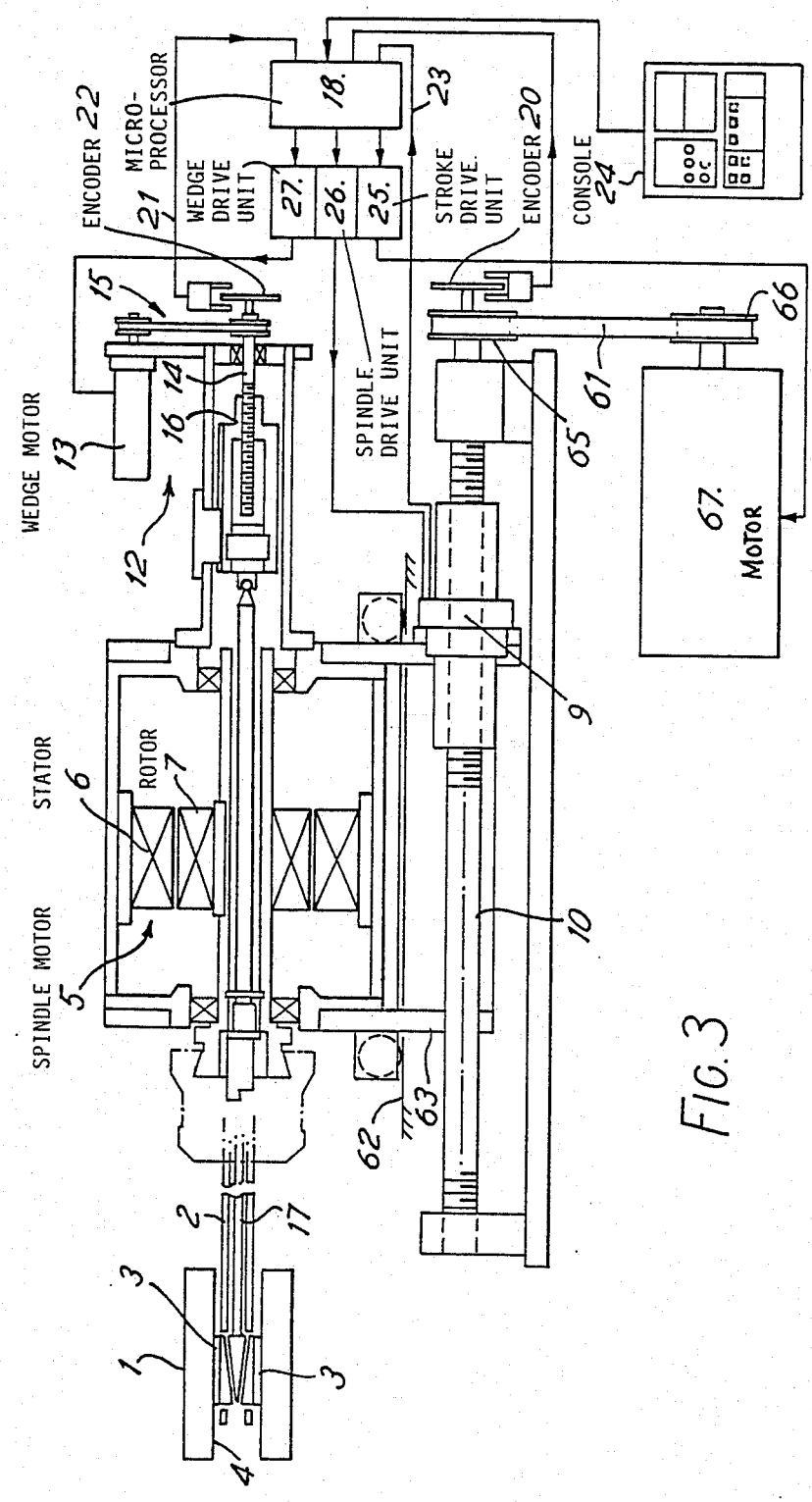
FIG. 3 is a schematic diagram illustrating the principles of operation of the machine.

The machine of FIGS. 1 and 2 is a vertical honing machine in which carriage 63 reciprocates vertically, with a counter-balance system as described. However, the principles of the machine apply equally if the carriage is arranged to reciprocate at an angle with respect to the vertical, with suitable adjustment of the counter-balance forces. If the carriage reciprocates horizontally, no counter-balancing is required. FIG. 3 illustrates the principles of the machine in a horizontal arrangement. The work-piece being honed is shown at 1 and is fixed. The honing spindle 2 carries the honing stones 3 at its end which engage the wall of the bore 4 in work-piece 1 to effect honing. The spindle motor 5 is a 3-phase a.c. motor which comprises a stator 6 and a rotor 7. Rotor 7 has a hollow core which accommodates the hollow spindle 2.

The carriage 63 which rides on runners 62 and linear reciprocating movement is imparted to the carriage by a lead screw 10 which runs in a nut 9 in the carriage. The lead screw is turned by the direct-current stroke motor 67 via toothed belt 61.

Mounted on the stator housing assembly is a wedge control system 12 which comprises a direct-current wedge motor 13 which drives a lead screw 14 via a toothed belt and pulley system 15. A nut 16 runs on screw 14 and this is coupled to wedge drive strips 17. At the other end of strips 17 is a wedge expansion system which expands the stones 3 outwardly in response to forward axial movement of the strips. The stones are thus urged against the wall of the bore.

The use of a rotor/stator assembly with a hollow rotor mounted to reciprocate on the carriage allows the wedge control system to be bolted directly to the stator housing assembly and the mechanical linkage from the wedge motor to the wedge strips is thus direct without the necessity to by-pass a pulley drive or splined drive system. This enhances the wedge control accuracy.

Control of the system is effected by a micro-processor 18. The micro-processor receives an input on line 19 from a rotary position encoder 20 fixed to the shaft of the stroke motor 11. This input represents the position of the carriage 63. Another input is received on line 21 from a rotary encoder 22 fixed to the lead screw 14. This input represents the radial position of the stones 3. A further input is received on line 23 from a drive amplifier (not shown) for the spindle motor. This is a frequency input representative of the speed of the spindle motor. Further inputs are applied to the micro-processor from a console 24 which has manually operable push-buttons whereby the operator may set all functions and requirements for the honing operation.

The micro-processor applies control outputs to a stroke drive unit 25 which drives the stroke motor; a spindle drive unit 26 which drives the spindle motor; and a wedge drive unit 27 which drives the wedge motor.

Figure 4:
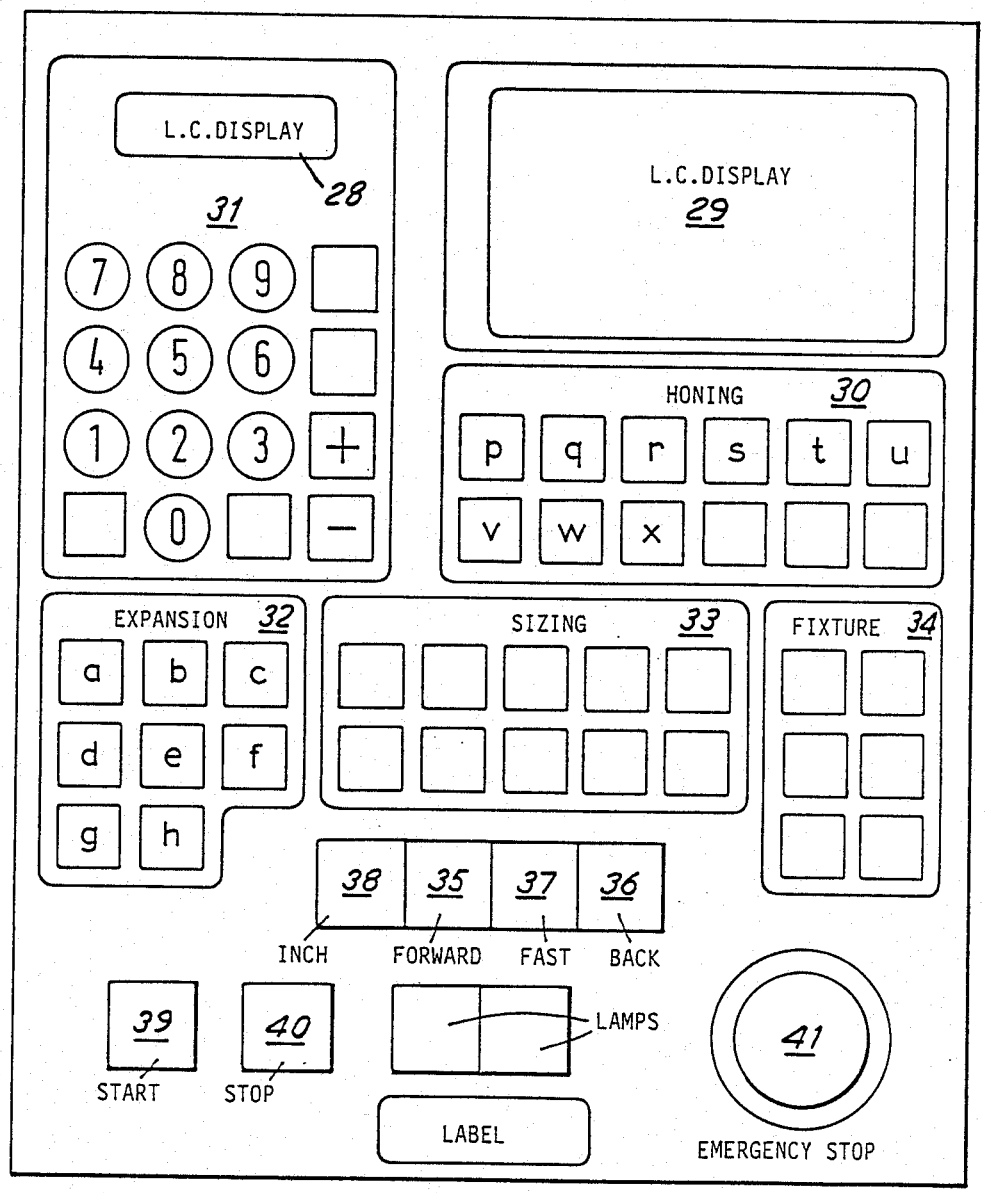
FIG. 4 is a diagram of the control console of the machine.

FIG. 4 shows the layout of the console 24. The console allows machining and wedge parameters to be put into the micro-processor. Two liquid-crystal displays 28 and 29 allow the parameters to be displayed as they are input. The inputs may be recalled at will. A machine parameter key-pad 30 has keys for setting the following parameters: hone park; start point; end point; velocity; spindle speed; stroke length; short stroke length; and number of short strokes. In order to set a figure for one of the parameters the numerical key-pad 31 is used after depression of the appropriate parameter key. Also, there is a test mode facility on key-pad 30.

A wedge parameter key-pad 32 has keys for setting the following parameters: stone pressure (a); wedge angle (b); stones worn (c); maximum stone pressure (d); retract distance (e); stones in contact (f); approach or initial feed speed (g); and honing, or final feed speed (h).

A sizing key-pad 33 has keys for setting the following sizing parameters: plug mode; timer mode; timer set; stone wear set; manual compensate; automatic compensate; tolerance; diametric clearance and match gauge.

A fixture key-pad 34, which relates to control of the work-piece fixture F, has keys for the following functions: manual; step; auto-load; and manual clamp.

There are manual controls for adjusting the position of the spindle. Key 35 moves the spindle forwards, key 36 moves it back and "fast" and "inch" keys 37 and 38 control the speed of adjustment. Finally there are start and stop cycle keys 39, 40, an emergency stop key 41 and a "controls on" and a datum key 42 and 43 respectively.

Figure 5:
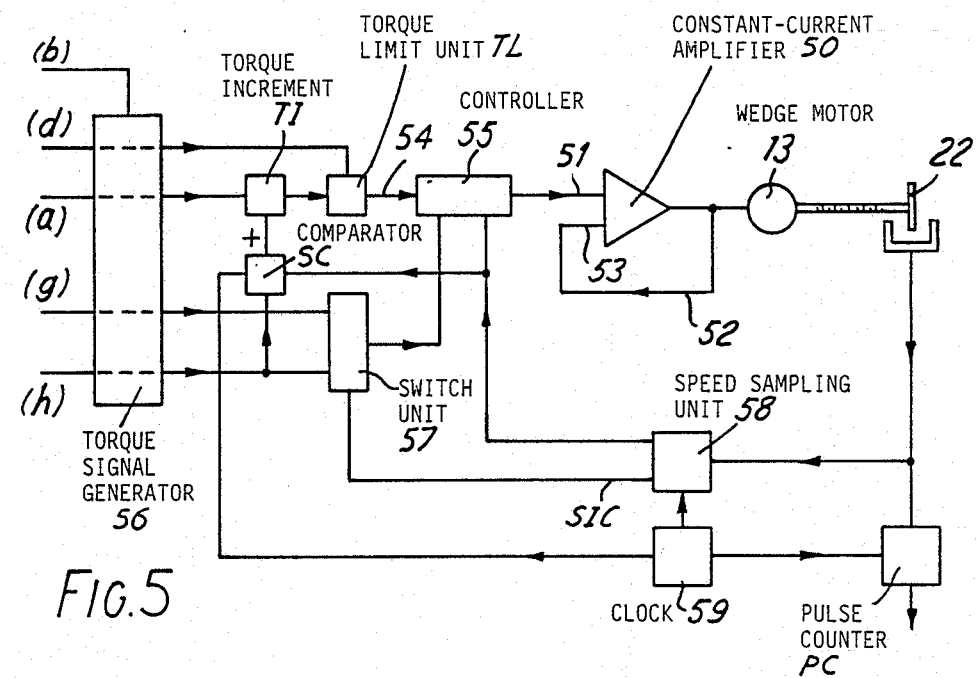
FIG. 5 is a block circuit diagram of the stone expansion system.

Referring now to FIG. 5 there is shown a block diagram of the stone expansion system of the honing machine. The functions of the stone expansion system could be met equally by an assembly of discrete circuits or, as in the preferred embodiment by a micro-processor. In the micro-processor embodiment, the functions of the elements shown in FIG. 5 are performed by program routines.

In FIG. 5 the wedge motor 13 is shown driven by a constant-current amplifier 50. The amplifier is a differential amplifier which receives a command voltage input on a line 51 and which has a feed-back connection 52 from the amplifier output to an input 53. The feedback connection ensures that the output current from the amplifier to the motor is strictly in accordance with the demand voltage on line 51 regardless of the speed of the motor. Since the motor is a d.c. motor, torque produced is proportional to the input current, regardless of speed. Thus, the torque of the motor follows precisely the demand voltage on line 51.

The voltage on line 51 is derived from a torque demand signal on a line 54 which is modified by an on/off controller 55. In turn, the torque demand signal on line 51 is derived from the output of a signal convertor unit 56 which accepts and operates on the stone pressure demand input (c) from the console 24 (FIG. 4) and the wedge angle input (b). One function of unit 56 is to calculate a torque signal from the required stone pressure input having regard to the wedge angle. This involves a division of the stone pressure input by the tangent of the wedge angle.

As described above, with a torque-controlled motor it is necessary to control also the speed when there is very little motor resistance during the approach phase as the stones approach the wall of the bore. The approach feed speed input (g) and the honing feed speed input (h) are applied through the convertor unit 56, where they are divided by the tangent of the wedge angle to a switch unit 57. In the approach phase the switching unit applies the converted signal derived from the command approach speed signal (h) as a control reference input to the on/off controller 55. A feedback speed input to the controller 55 is derived from a speed sampling unit 58 which receives a sampling control input from a clock 59 and pulses from the rotary encoder 22 coupled to the motor 13. The function of the speed sampling unit 58 is to sample the pulse rate from encoder 22 periodically and provide a signal to the controller 55 representative of the axial wedge drive speed, having regard to the reduction ratio of the gearbox (not shown) and lead-screw drive arrangement. Also, unit 58 provides a "stones in contact" signal SIC to operate the switch unit 57 when there is detected a sudden halting of the stones' progress as they meet the wall of the bore. This is manifested in the pulse count from encoder 22 remaining the same or changing only slightly over a number of consecutive sampling cycles. A pulse counter PC gives an output representative of the immediate position of the wedges. This is used in conjunction with the input positional signals such as "hone park", withdrawal distance and sizing controls to provide positional control of the wedges so as, for example, to stop honing when the required hone size is reached.

During the approach phase the converted signal derived from the command approach speed (g) is applied as reference input to the controller 55. However, on generation of the SIC signal the switch 57 operates to apply the converted signal derived from the honing feed speed command signal (h) as the reference signal. In a manner to be described, the controller 55 accepts the torque command signal to determine the torque to be generated by the motor, but modulates this signal in an on/off, or chopping, manner so as to control the motor speed. The controller 55 can be regarded as one form of a variable mark/space square-wave generator.

It is possible that during the honing phase the honing speed will not reach the command signal speed (h). In this case provision is made to increment the demand torque. A torque incrementer TI is connected between the torque signal generator 56 and the controller 55. A sampling comparator SC accepts speed inputs from the speed sampling unit 58 and from the signal derived from the honing speed input (h). Comparator SC is controlled by the clock 59 to determine whether the stone speed has failed to reach the honing speed (g) for a predetermined time. If so, an increment pulse is applied to torque incrementer TI to increment the torque signal.

In order to ensure that the torque is not incremented beyond safe limits there is provided a torque limit unit TL which accepts a maximum torque input signal MT and limits the torque signal to that level. Signal MT is derived as another output from the convertor 56 which performs the required calculation on the maximum stone pressure input (d) by division of the wedge angle tangent to give the corresponding maximum torque signal MT.

Figure 6:
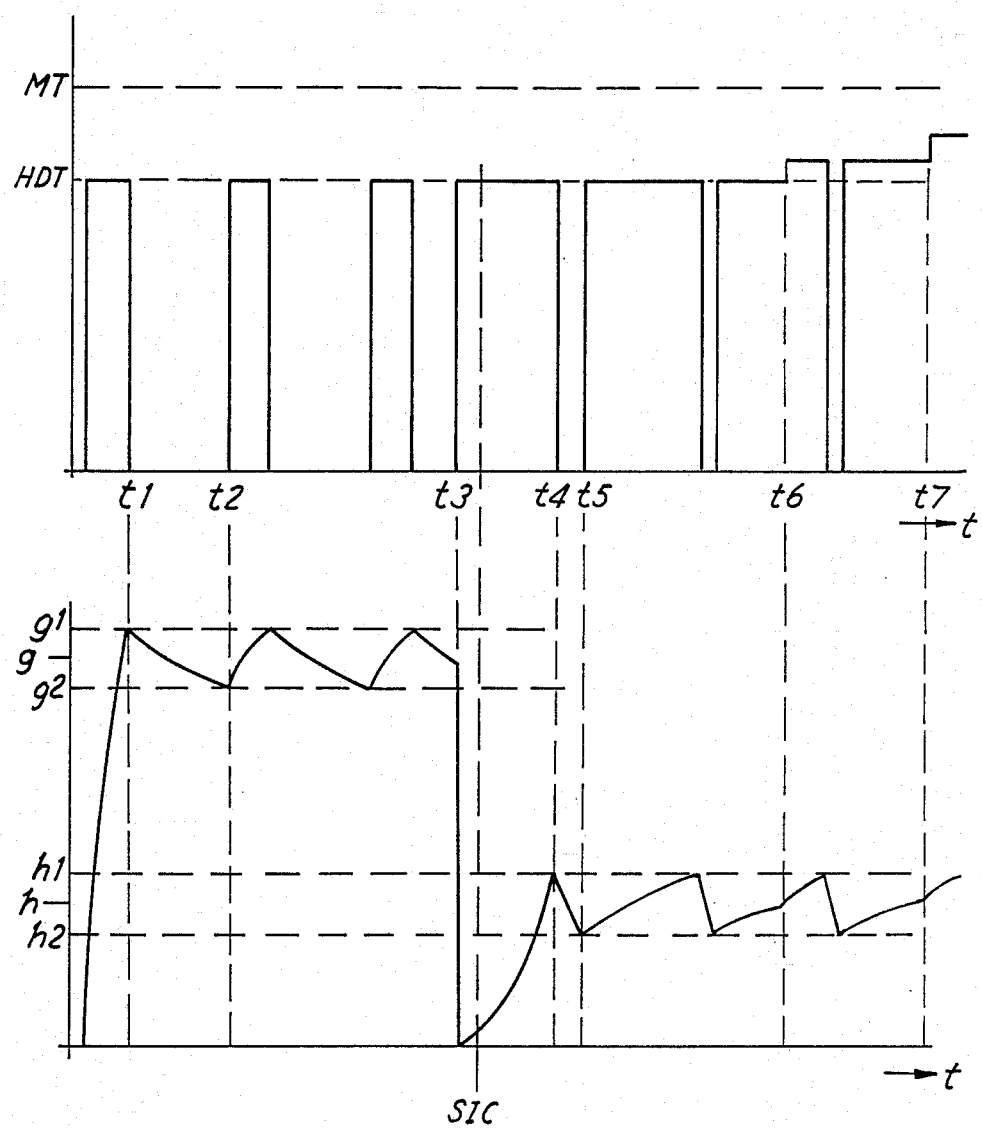
FIG. 6 is a wave-form diagram illustrating the operation of the stone expansion system.

FIG. 6 is a two-part wave-form diagram illustrating the operation of the stone expansion system. At (a) there is shown a graph of torque against time. At (b) there is shown a corresponding graph of speed against time. On the graphs are shown the honing demand torque HDT corresponding to input (a); the maximum torque MT corresponding to input (d); the demand approach feed speed (g); the demand honing feed speed (h); upper and lower cut-off approach feed speeds g1 and g2; and upper and lower cut-off honing feed speeds h1 and h2.

Initially, the stones begin clear of the wall of the bore, controller 55 detects that the stone speed (zero) is less than the upper cut-off speed g1 and switches on the torque signal HDT. The stones accelerate rapidly until speed g1 is reached at time t1 when the controller switches off the torque signal. The stones decelerate until the lower cut-off speed g2 is reached at time t2 whereupon the controller switches on the torque signal again, and so on. In this way the approach speed is regulated in spite of a honing torque command having been set. The difference between speeds g1 and g2 represents the hysteresis of the system.

At time t3 the stones meet the wall of the bore and are halted thereby. This condition is detected by the speed sampling unit 58 which then issues the "stones in contact signal" SIC. Thereafter the reference signal to the controller 55 is the demand honing feed speed (h). The stones are operated to provide the input pressure (a) against the wall of the bore and their feed speed increases until at time t4 it reaches speed h1. This causes the controller to switch off the torque signal and allow the stones to decelerate to speed h2 at time t5. On/off control is effected to maintain speed (h).

If the demanded feed speed (h) is not achieved within a certain time this is detected by sampling comparator SC and the torque is incremented as at time t6. Further failure to achieve the feed speed will again operate this over-ride arrangement at time t7, for example. A limit of maximum torque of MT is defined by unit TL as described.

The output from pulse counter PC (FIG. 5) represents the position of the stones and is used in conjunction with the sizing input commands to control the stone expansion. It is to be noted that because of the lead-screw wedge drive arrangement, retraction of the wedges is effected positively by reversing the wedge motor. During retraction there is very little resistance to the wedge movement and speed is limited by the chopping technique described above. For example, when the preset bore size has been reached, the stones are retracted to the set retract distance. In some embodiments of the invention, switching from the speed priority control of stone expansion during approach to the torque priority control during honing may be effected at a predetermined particular position in response to the output from the pulse counter instead of from a "stones in contact" detector described above. The "stones worn" input (c) is used to set a position at which the stone carriers could be expected to be nearly touching the wall of the hone as a result of stone wear. An alarm is activated to warn the operator. The "stones in contact" input is a preset distance corresponding to the position of the stones when they are in contact with a bore of proper finished size. This input is therefore used for automatic finishing of bores to a predetermined size.

It is possible to operate two modes of gauging. In the first mode, simple gauging is effected by manual measurement and re-honing as necessary. In the second mode, match gauging is effected by reference to a gauge output which, after honing, applies a gauge signal to the micro-processor representative of the size of the bore. This provides a reference, having regard to the input parameters, of the tolerance of the honing operation. If the operation is outside tolerance, re-honing is possible. However, if the operation is within tolerance, a feedback signal is supplied which represents any inaccuracies due, for example, to stone wear. This information is used automatically to control the next honing operation, perhaps with reference to a match-gauged component. Thus, it is possible to specify at the console the clearance required in the hone with respect to the piston or pin to be used therein.

Figure 7:
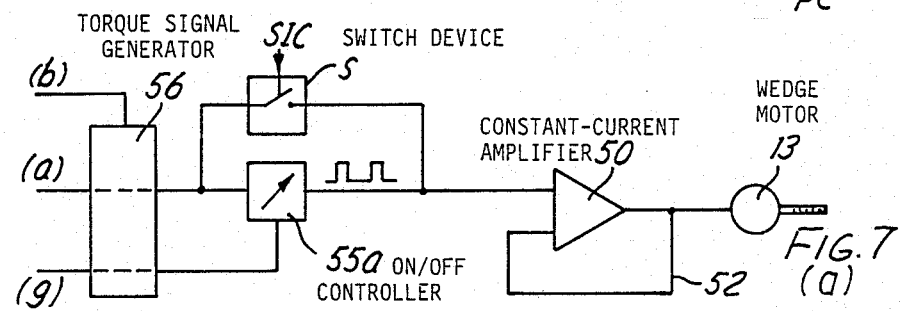
FIG. 7 is a block diagram showing possible alternatives in the stone expansion system.
Figure 7:
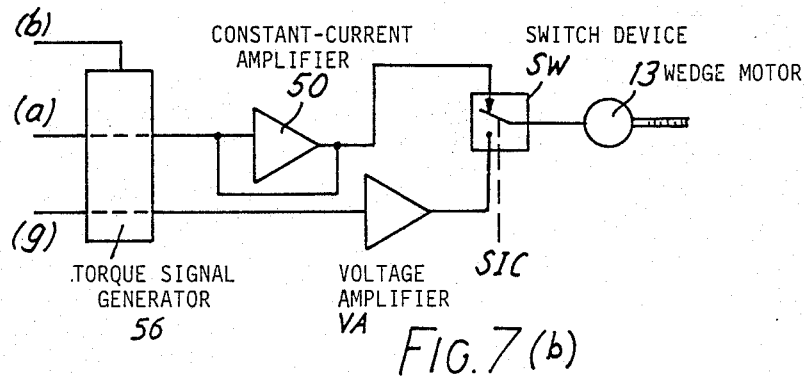

The invention is not restricted to the details of the embodiment described above. FIG. 7 shows examples of modifications which may be made. In FIG. 7 (a) the on/off controller 55a is a variable mark/space square-wave generator the mark/space ratio of which is controlled by the approach speed input (g), as modified by the wedge angle. The torque signal is generated as before from the wedge angle input (b) and the stone pressure input (a) and is chopped by the controller 55a to control motor speed. In this embodiment there is no speed feed-back and the required setting of mark/space ratio for a particular approach speed is determined empirically. The "stones in contact" signal SIC is effective to operate a switch device S to by-pass the speed control and allow the honing operation to be determined by the pre-set stone pressure. In this embodiment there is no feed speed control during honing.

In FIG. 7 (b) the approach phase is controlled by a voltage amplifier VA which produces a voltage ouput to motor 13 in proportion to the approach speed input (g), as modified by the wedge angle. The honing phase is controlled by the constant-current amplifier arrangement responsive to stone pressure and wedge angle. The "stones in contact" signal SIC switches the motor to be fed by the appropriate drive device via a switch device SW.

Although it is preferred to generate the "stones in contact" signal automatically, this is not essential. Switching from the approach phase to the honing phase may be made at a predetermined position which will be known to be close to the wall of the bore. Also, it is envisaged that during honing the demand stone pressure or honing speed may be changed at one or more predetermined positions. Thus, towards the end of the honing operation as the bore reaches the required size the honing pressure and/or the honing speed may be reduced in predetermined manner if desired.

We claim:

1. A stone expansion system for a honing machine which has honing stones mounted to expand radially with respect to a spindle of the machine; a stone expansion drive motor and a stone expansion drive linkage coupling the motor to the stones, the motor being a d.c. electric motor, the stone expansion system being characterised in that there is provided a constant-current amplifier connected to drive the motor; a torque control system whereby the operator can set a torque command input to determine the amplitude of the current from the constant-current amplifier; and a speed control system whereby the operator can set at least one speed command input to determine the speed of the motor, the arrangement being such that the speed control system is effective to ensure control of speed as the stones approach the wall of the bore and that the torque control system is effective to control stone pressure during honing.

2. A stone expansion system as claimed in claim 1 wherein the speed control system comprises an on/off chopping controller responsive to the speed command input and effective to cause the output current from the constant-current amplifier to be modulated in an on/off manner to control the speed of the motor.

3. A stone expansion system as claimed in claim 2 wherein the speed control system is a feed-back system, there being a speed detector coupled to the motor which gives an output in accordance with the motor speed, and a comparator arrangement for comparing the output of the speed detector with the speed command input to give a speed error signal, the on/off chopping controller being responsive to the speed error signal.

4. A stone expansion system as claimed in either of claims 2 or 3 wherein the speed control system accepts a first speed command input representative of required stone approach speed and a second speed command input representative of required honing feed speed and means are provided for detecting when the stones come into contact with the wall of the bore being honed and for automatically changing the input control speed of the speed control system from the approach command input speed to the honing feed command input speed when the stones meet the wall of the bore.

5. A stone expansion system as claimed in claim 4 comprising a digitial encoder coupled to the motor for providing an output pulse for each increment of motor movement, position detector means for counting the pulses to give a positional output representative of the position of the stones, and speed detector means for determining the pulse rate and thus the expansion speed of the stones, said means for detecting when the stones come in to contact with the wall of the bore being effective to detect when the pulse count does not change or does not change appreciably in a given time.

6. A stone expansion system as claimed in claim 2 or 3 wherein over-ride means are provided for over-riding the torque command input to increase incrementally the amplitude of the current from the constant-current amplifier if the motor speed does not meet the honing feed speed command input.

7. A stone expansion system as claimed in claim 6 wherein means are provided for allowing the operator to set a maximum torque command and the over-ride means ensures that the current from the constant-current amplifier does not exceed a value corresponding to the maximum torque command input.

8. A stone expansion system as claimed in claim 2 or 3 including a wedge system having a wedge arrangement whereby axial movement with respect to the spindle axis is converted to radial movement of the stones and wherein the torque command input and, where appropriate, the maximum torque command input, are derived by conversion means, there being provided an operator input means which allows the operator to specify a stone pressure command input and, where appropriate, a maximum stone pressure command input and another operator input means which allows the operator to specify the wedge angle, the torque command signals being derived in the conversion means, by a calculation taking account of the stone pressure command and wedge angle specified.

9. A stone expansion system as claimed in claim 2 or 3 wherein the on/off chopping controller is a variable square-wave generator in which the mark/space ratio is adjusted in accordance with the speed command input.

10. A stone expansion system as claimed in claim 2 or 3 wherein the on/off chopping controller is responsive to switch the drive current to the motor on when the motor speed falls below a lower limit and to switch the current off when the motor speed rises above an upper limit, thereby generating a square wave current which controls the motor speed, the upper and lower limits being derived from the speed command input setting.

11. A stone expansion system as claimed in claim 2 or 3 which is controlled by a micro-processor, there being an input console which accepts digital command inputs from the operator and a clock-controlled sampling system which samples the position of the stones repetitively from a digital encoder, the torque control system and the speed control system being implemented by respective micro-processor program routines deriving data inputs from the input console and the sampling system.

12. A stone expansion system for a honing machine comprises a hollow spindle; an expandable honing stone carrier arrangement at the end of the spindle; a stroke motor for reciprocating the spindle relative to a workpiece; and a wedge control system for expanding the stroke carrier arrangement by axial movement of wedges having extension strips which pass along the hollow spindle; there being provided a drive motor for rotating the spindle, the drive motor comprising a stator/rotor assembly, the rotor having a hollow core which carries the hollow spindle, the stator being mounted in a housing assembly, the wedge extension strips passing through the core of the rotor and the wedge control system being fixed directly to the stator housing assembly.

* * * * *